United States Patent [19]

Breeden et al.

[11] Patent Number: 4,529,511
[45] Date of Patent: Jul. 16, 1985

[54] WATER TREATMENT CONTAINER

[75] Inventors: Rex E. Breeden; Raymond A. Loturco, both of Columbus, Ind.

[73] Assignee: Blairex Laboratories, Inc., Evansville, Ind.

[21] Appl. No.: 534,067

[22] Filed: Sep. 20, 1983

[51] Int. Cl.³ .............................................. B01D 27/02
[52] U.S. Cl. ................................. 210/94; 210/266; 210/282
[58] Field of Search ............... 210/94, 263, 266, 282; 422/100, 101

[56] References Cited

U.S. PATENT DOCUMENTS

| | | | |
|---|---|---|---|
| 2,207,294 | 7/1940 | Hubner et al. | 221/60 |
| 2,299,572 | 10/1942 | Estenes | 15/136 |
| 2,500,134 | 3/1950 | Murray | 210/24 |
| 2,620,095 | 12/1952 | Buchan | 222/193 |
| 2,761,833 | 9/1956 | Ward | 210/24 |
| 2,781,312 | 2/1957 | Klumb et al. | 210/94 |
| 2,869,724 | 1/1959 | McDevitt | 210/94 |
| 3,038,610 | 6/1962 | Hetherington | 210/282 |
| 3,389,803 | 6/1968 | Barley | 210/282 |
| 3,430,769 | 3/1969 | Sanzenbacher | 210/282 |
| 3,449,081 | 6/1969 | Hughes | 210/282 |
| 3,952,341 | 4/1976 | Cain | 4/255 |
| 4,294,699 | 10/1981 | Herrmann | 210/263 |
| 4,296,071 | 10/1981 | Weiss et al. | 604/295 |

Primary Examiner—Ivars Cintins
Attorney, Agent, or Firm—Barnes & Thornburg

[57] ABSTRACT

A water treatment container is disclosed having a first chamber of variable volume and an second chamber for containing a water treating agent such as an ion exchange resin. Retainers are situated on the inlet and outlet of the second chamber to retain the water treating agent within the second chamber. Filters are positioned adjacent to retainers to filter the water. The first chamber is constructed so as to have a manually variable volume. Water added to the first chamber is caused to flow through the second chamber and out a dispensing outlet as the volume of the first chamber is reduced by application of a manually applied pressure.

11 Claims, 1 Drawing Figure

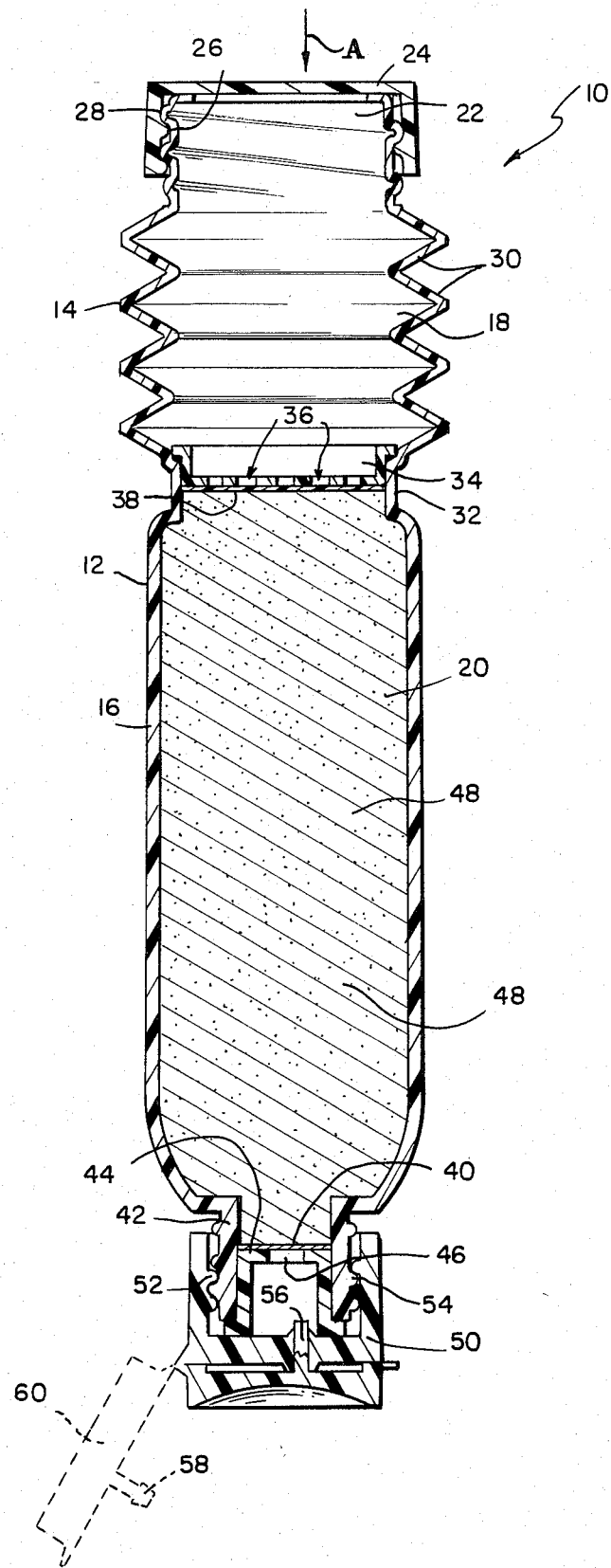

WATER TREATMENT CONTAINER

The present invention relates generally to fluid purification by a particulate material contained within a hand manipulated container, and more particularly to a container for the fluid-treating agent which includes a manually actuated fluid containing chamber integral with the fluid treating chamber.

The proper care of soft contact lenses requires the periodic treatment of the lenses with distilled water into which one dissolves a salt tablet or enzymatic cleaning tablet. The water required for such treatment is intended to be purified to USP XX standards which can be achieved by either distilling or deionizing the water. Ordinary tap water does not meet the standard, and the use of ordinary tap water during such treatment can cause significant problems to develop with the contact lenses or in the eye of one who should thereafter wear such an improperly treated lens. Wearers of such lenses and others have long sought a convenient means for obtaining deionized or otherwise purified water which would not require the carrying of bulky bottles and instead would travel easily in a purse or suitcase.

In accordance with the present invention a fluid treatment apparatus comprises a generally tubular hollow body having a first and second portion, the second portion including a fluid treating agent. A retainer is situated at each end of the second portion to retain the fluid treating agent within the second portion. The first portion is constructed so as to permit the volume of the first portion to be diminished in response to a manually applied pressure.

For the treatment of soft contact lenses, the fluid treating agent is preferrably an ion exchange resin for purifying water. Other water treating agents which may be used to achieve potable water are activated charcoal and calcium hypochlorite. Other flud treating agents can be employed where the fluid being treated is other than water. Where tap water is being treated, the water is introduced into the first portion of the apparatus through an opening which is then closed. The first portion of the apparatus is then manually compressed so as to cause the water to be pumped through the water treating agent in the second portion of the apparatus and to emerge from an outlet of the second portion.

In a preferred embodiment of the present invention, the tubular hollow body is unitarily formed of polyethlene or other resin by a blow molding process. Filters and filter supports can then be added to opposite ends of the second chamber or portion of the apparatus between which is situated the generally particulate water treating agent. Conventional end caps can be employed to seal both ends of the tubular body. The cap present on the water treating portion of the apparatus can include an appropriate dispensing nozzle so as to permit enhanced control of the apparatus during its use. The first chamber preferrably is formed with a side wall in the form of a cylindrical resilient bellows which can be collapsed in response to the application of an axial pressure generated, for example, between the thumb and fingers of the user of such a device.

The various features and advantages of the invention will become even more apparent to those skilled in the art upon consideration of the following detailed description of the preferred embodiment exemplifying the best mode of carrying out the invention as presently preceived. The detailed description particularly refers to the accompanying figure which illustrates such an apparatus in section.

A water treatment apparatus 10 in accordance with the present invention comprises a generally tubular hollow body 12 having a first portion 14 and a second portion 16. The first portion 14 of body 12 encloses a first chamber 18 while the second portion 16 of body 12 encloses a second chamber 20. The first chamber 18 includes an inlet 22 through which water may be introduced into the first chamber 18. The inlet 22 is closed by an appropriate sealing means 24 which is shown to be a conventional cap having internal threads 26 which engage threads 28 on the first portion 14 of body 12. The first portion 14 of body 12 also includes a plurality of anular slanted portions 30 integrally joined together in the form of a cylindrical resilient bellows which permits the volume of chamber 18 to be reduced by the application of an axial force A.

The first portion 14 and second portion 16 of the apparatus 10 are separated from each other by a neck portion 32 which has a smaller interior diameter than either portion 14 or 16. The neck portion 32 simultaneously defines the outlet from the first chamber 18 and the inlet to second chamber 20. A porous plug 34 is situated in neck 32 and includes a plurality of apertures 36 through which water can easily flow from the first chamber 18 to the second chamber 20. Contiguous to the porous plug 34 is a filter 38. The filter is preferably about a 5 micron mesh filter. This filter is generally so fine that the water can only pass through the device under some force other than gravity. An example of a satisfactory filter material is one supplied by Tetko Incorporated, Elmsford, N.Y. under the designation HD7-1 Woven Monofilament Polyester filter. The same filter material is used to also form filter 40 on the outlet and 42 of second chamber 20. The outlet filter 40 is maintained in position by a plug 44 having one or more apertures 46. The filters 38 and 40 and supporting members 34 and 44 respectively act to filter bacterial agents from the water and to retain a particulate water treating agent 48 within chamber 20.

The chemical makeup of the particulate water treating agent was discussed previously. The condition of some water treating agents can be ascertained by visual inspection and for that reason at least portion 16 of body 12 is constructed of a material sufficiently transparent to permit that inspection of the water treating agent 48. The illustrated embodiment can be conveniently formed of polyethylene by conventional blow molding processes.

The outlet end 42 of apparatus 10 also includes a cap 59 secured to the body 12 by means of threads 52 interacting with threads 54 on the outer surface of outlet end 42. The cap 50 includes a dispensing orifice 56 which is closed by prong 58 which is a portion of hinged member 60 shown in the figure in the dispensing position in phantom. The caps 50 and 24 are both conventionally available items.

In use, water is added to first chamber 18 and cap 24 secured in place. Hinged member 60 is opened to the phantom position. The apparatus is then grasped, typically about the neck portion 32, between one's index finger and middle finger. One's thumb is then applied to cap 24 and a force applied in direction A thereby causing the bellows of the first portion 14 to collapse. The collapsing bellows causes the volume of chamber 18 to be reduced thus forcing water from chamber 18 through filter 38 into chamber 20 where it contacts the water treating material 48. As the force continues, the water continues through chamber 20 through filter 40 and out dispensing orifice 56 as a stream of treated water.

In laboratory tests, water containing live bacteria was loaded into the bellows chamber 14. The water was forced through the ion exchange resin which was one sold by Rohm & Haas under the designation Amberlite MB-3. The length of the chamber containing the ion exchange resin was approximately three and a half inches and contained approximately six cubic inches of ion exchange resin. The bacteria were prevented from passing through the apparatus by the filters 38 and 40. The deionized water generated during the test was comparable to either distilled or deionized water sold commercially and satisfied applicable standards.

Although the invention has been described in detail with reference to a preferred embodiment and a specific example, variations and modification exist within the scope and spirit of the invention as described and as defined in the following claims.

What is claimed is:

1. A fluid treatment apparatus comprising a unitarily formed tubular body including
    a first fluid reservoir chamber, the first chamber having a sidewall in the form of a cylindrical resilient bellows for permitting the volume of the chamber to be varied by the application of an axial force,
    a second collinear chamber for containing a fluid treating agent and having an inlet and an outlet, the second chamber inlet being situated contiguously to the first chamber outlet,
    retaining means situated in the second chamber inlet and outlet for retaining the fluid-treating agent in the second chamber, and
    means sealing the first chamber for causing fluid to flow from the first chamber through the second chamber and out the second chamber outlet as the volume of the first chamber is reduced by the application of said axial force.

2. The apparatus of claim 1 wherein the fluid-treating agent is an ion-exchange resin.

3. The apparatus of claim 1 wherein the fluid-treating agent is selected from the group consisting of Zeolite, activated charcoal, and calcium hypochlorite.

4. The apparatus of claim 1 wherein the retaining means comprises a filtering means for filtering the water entering and leaving the second chamber.

5. The apparatus of claim 1 wherein the first chamber further comprises an inlet and an inlet sealing means for sealing the inlet.

6. The apparatus of claim 1 further comprising means for selectively sealing the second chamber outlet.

7. A fluid treatment apparatus comprising a generally tubular unitarily formed hollow body including a first portion having an inlet through which the fluid to be treated can be introduced into the first portion and a second portion having an outlet, the inlet, first portion, second portion, and outlet being disposed in a serial, collinear relation, the second portion including a fluid-treating agent and retaining means for retaining the fluid-treating agent within the second portion, the first portion including means for permitting the volume of the first portion to diminish in response to manually applied axial pressure to cause treated fluid to be dispensed from the outlet of the second portion and filtering means adjacent to the retaining means for filtering the fluid as it passes through the apparatus.

8. The apparatus of claim 7 further comprising means removable from the first portion for permitting the introduction of untreated fluid therein.

9. The apparatus of claim 7 wherein the body consists essentially of a material sufficiently transparent to permit visual inspection of the fluid-treating agent situated therein.

10. The apparatus of claim 7 wherein the filtering means comprises a filter having about a 5 micron mesh.

11. A fluid treatment apparatus comprising:
    a first chamber having a volume variable by the application of an axial force, and an outlet,
    a second collinear chamber for containing a fluid-treating agent and having an inlet and an outlet, the second chamber inlet being situated contiguously to the first chamber outlet,
    retaining means situated in the second chamber inlet and outlet for retaining the fluid-treating agent in the second chamber, and
    means sealing the first chamber for causing fluid to be retained in the first chamber when no axial force is applied to the first chamber and to flow from the first chamber through the second chamber and out the second chamber outlet as the volume of the first chamber is reduced by the application of the axial force.

* * * * *